July 29, 1969  J. C. CATLETT ET AL  3,457,674
AUTOMATIC BALANCED DOOR OPERATOR
Filed March 22, 1967  7 Sheets-Sheet 1

INVENTORS
JOHN C. CATLETT &
JAMES R. GILSON
BY Ralph W. Kalish
ATTORNEY

INVENTORS
JOHN C. CATLETT &
JAMES R. GILSON
BY Ralph W. Kalish
ATTORNEY

INVENTORS
JOHN C. CATLETT &
JAMES R. GILSON,
BY Ralph N. Kalish
ATTORNEY

July 29, 1969
J. C. CATLETT ET AL
3,457,674
AUTOMATIC BALANCED DOOR OPERATOR
Filed March 22, 1967
7 Sheets-Sheet 4
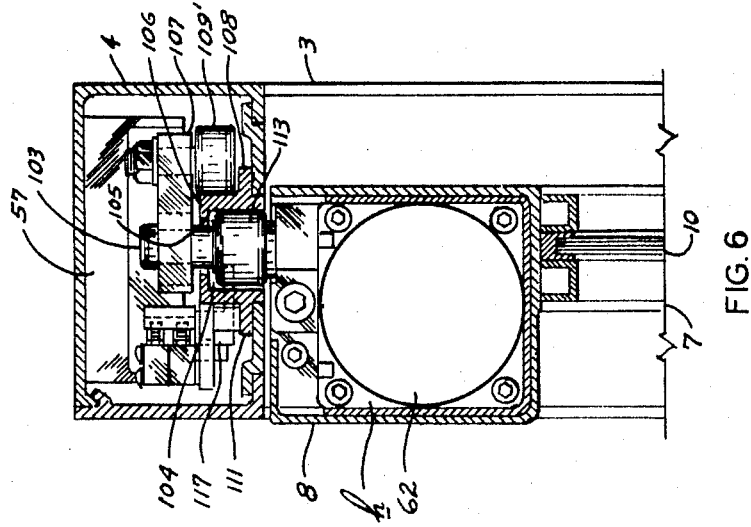
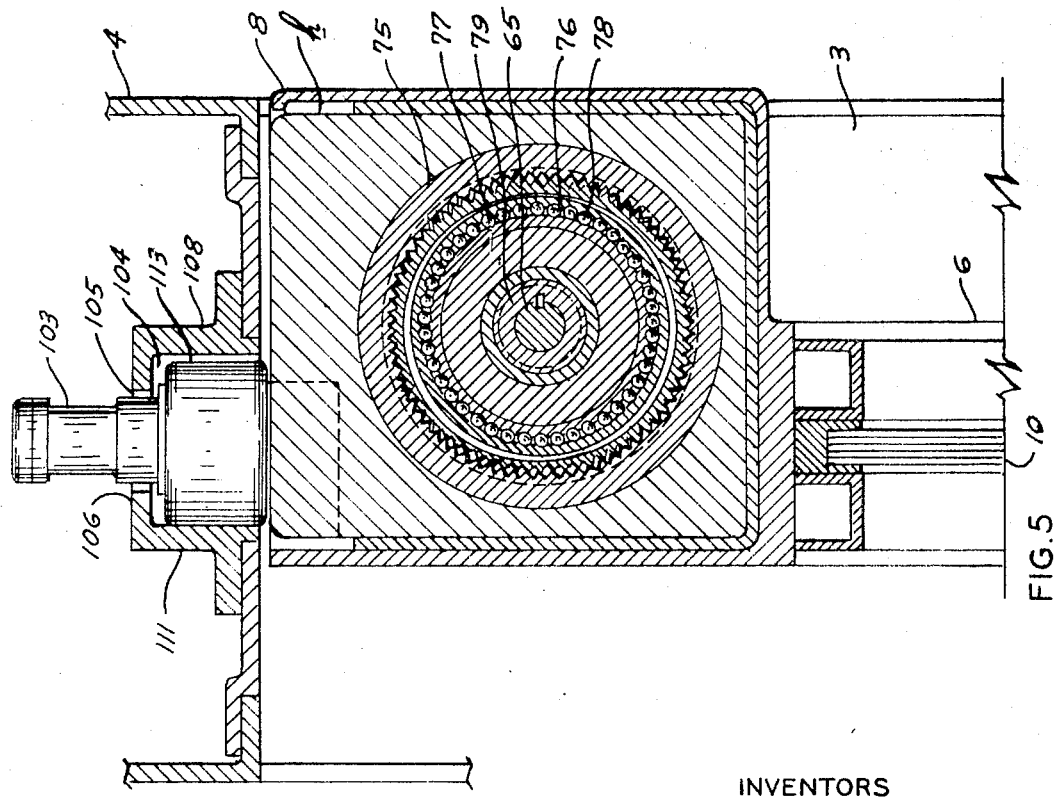
INVENTORS
JOHN C. CATLETT &
JAMES R. GILSON
BY
ATTORNEY July 29, 1969  J. C. CATLETT ET AL  3,457,674
AUTOMATIC BALANCED DOOR OPERATOR
Filed March 22, 1967  7 Sheets-Sheet 6

INVENTORS
JOHN C. CATLETT &
JAMES R. GILSON
BY Ralph W. Kalish
ATTORNEY

July 29, 1969  J. C. CATLETT ET AL  3,457,674
AUTOMATIC BALANCED DOOR OPERATOR

Filed March 22, 1967  7 Sheets-Sheet 7

INVENTORS
JOHN C. CATLETT &
JAMES R. GILSON
BY  Ralph W. Kalish
ATTORNEY

United States Patent Office 3,457,674
Patented July 29, 1969

3,457,674
AUTOMATIC BALANCED DOOR OPERATOR
John C. Catlett, Chicago, and James R. Gilson, Highland Park, Ill., assignors to Gyro-Tech Door Company, Memphis, Tenn., a corporation of Illinois
Filed Mar. 22, 1967, Ser. No. 625,246
Int. Cl. E05f *11/24, 15/02, 15/10*
U.S. Cl. 49—340      12 Claims

ABSTRACT OF THE DISCLOSURE

An automatic balanced door operator comprising in combination a door having a balanced hinge arrangement and a compact power unit for effecting swinging of said door about its pivot axis, the power unit having a motor, a speed reducer and a gear shaft for transmitting motion through bevel gears to the door pivot axis for door opening operation; there being a compression spring of spiral character adapted for storing of energy upon door opening for providing the motive force for door closing action.

Background of the invention

Heretofore various expedients have been developed for automatic operation of hinged doors with the same being normally actuated by photoelectric cells, switch mats and the like. However, with doors hinged upon a jamb the power requirements have been substantial in view of the normal forces acting upon such doors in usage, such as stack pressures, wind pressures, pressure differentials brought about by temperature changes, as well as by the over-all weight of the doors. In door operators for swing doors the same have required motors of relatively large rated capacity with complex motion transmitting means primarily of reciprocatory character for effecting door swinging operation. Such operators have proved exceedingly expensive in production and require frequent maintenance during operation. Prior art structures which demonstrate door operators for jamb-hinged doors are disclosed in United States Patent Nos. 3,087,720, 3,237,893 and 3,247,615.

Summary of the invention

It is an object of the present invention to provide a door having a balanced hinged arrangement and a door operator for use therewith to effect automatic door opening and closing.

It is another object of the present invention to provide an automatic balanced door operator which is relatively compact and being adapted for mounted disposition upon the door for movement therewith.

It is an additional object of the present invention to provide an automatic balanced door operator which incorporates novel motion transmitting means so that a constant rotary movement from the power source to the door pivot is effected, thereby obviating the heretofore requisite complex means involving reciprocal operating components.

It is a further object of the present invention to provide an automatic balanced door operator having a novel bearing arrangement for the hinge assembly of the door for compensating for misalignment as well as to render the door operation facile and to enhance the life of the system.

It is another object of the present invetion to provide an automatic balanced door operator which incorporates a unit which serves to reduce speed during door opening operation and to increase speed during door closing operation.

It is a still further object of the present invention to provide an automatic balanced door operator which is compact, which embodies a permanent magnetic-type motor adapted to effect dynamic braking upon door closing and which is most durable in usage.

It is a further object of the present invention to provide an automatic balanced door operator which may be most economically manufactured; the elements of which are designed for minimal friction so as to conduce to long life; which does not require constant maintenance in view of the simplicity of the components; and which is reliable in usage.

Brief description of the drawings

FIGURE 5 is a vertical transverse sectional view taken on the line 5—5 of FIGURE 3.

FIGURE 6 is a vertical transverse sectional view taken on the line 6—6 of FIGURE 3.

Description of the preferred embodiment

Figure 1:
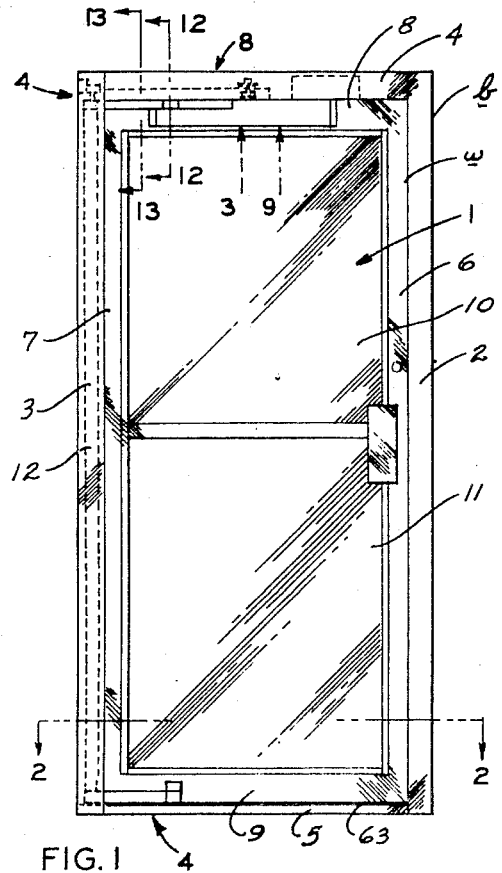
FIGURE 1 is a front view of a balanced door constructed in accordance with and embodying the present invention.

Referring now by reference characters to the drawings which disclose practical embodiments of the present invention, 1 generally designates a door for disposition within a doorway *w* defined by a frame *b* comprising vertical jambs 2, 3, a header 4 and a base 5. Door 1 may incorporate vertical rails 6, 7 and upper and lower leafs 8, 9, respectively, which are preferably formed of metal and are adapted to receive the edge portions of glass panels 10, 11. Said rails and leafs may be desirably produced through extrusion so as to present interior volumes for purposes presently appearing.

Figure 2:
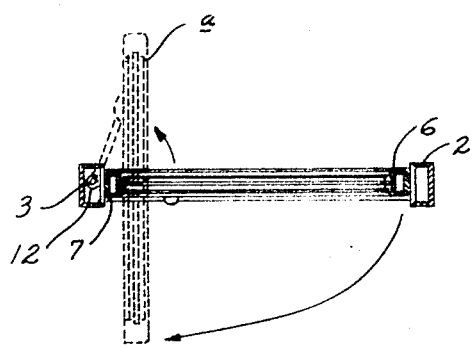
FIGURE 2 is a horizontal transverse sectional view taken on the line 2—2 of FIGURE 1 and indicating the path of movement of the door between open and closed conditions.
Figure 12:
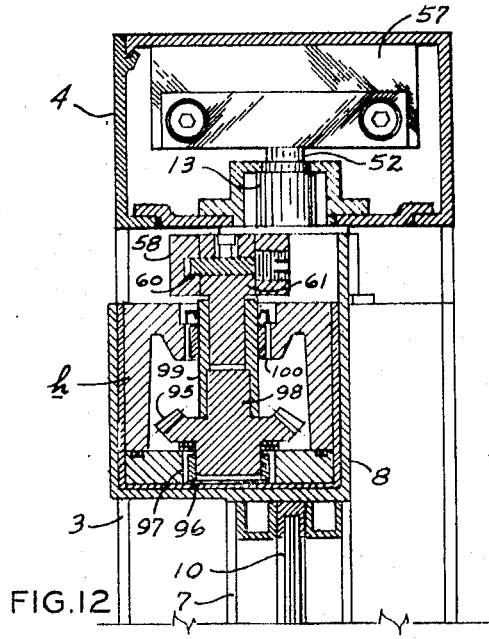
FIGURE 12 is a vertical transverse sectional view taken on the line 12—12 of FIGURE 1.
Figure 13:
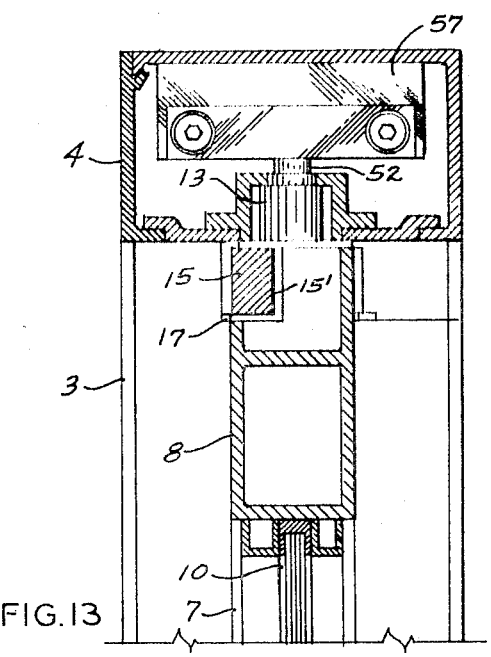
FIGURE 13 is a vertical transverse sectional view taken on the line 13—13 of FIGURE 1.

Door 1 is of the balanced type, being related to door frame *b* for swinging about an axis located inwardly of jamb 3, whereby, upon swinging, a part of the door as indicated at *a* in FIGURE 2 will swing inwardly and the other equal part, as indicated at *b*, will swing outwardly, with door 1 thus being folded back toward jamb 3.

Figure 4:
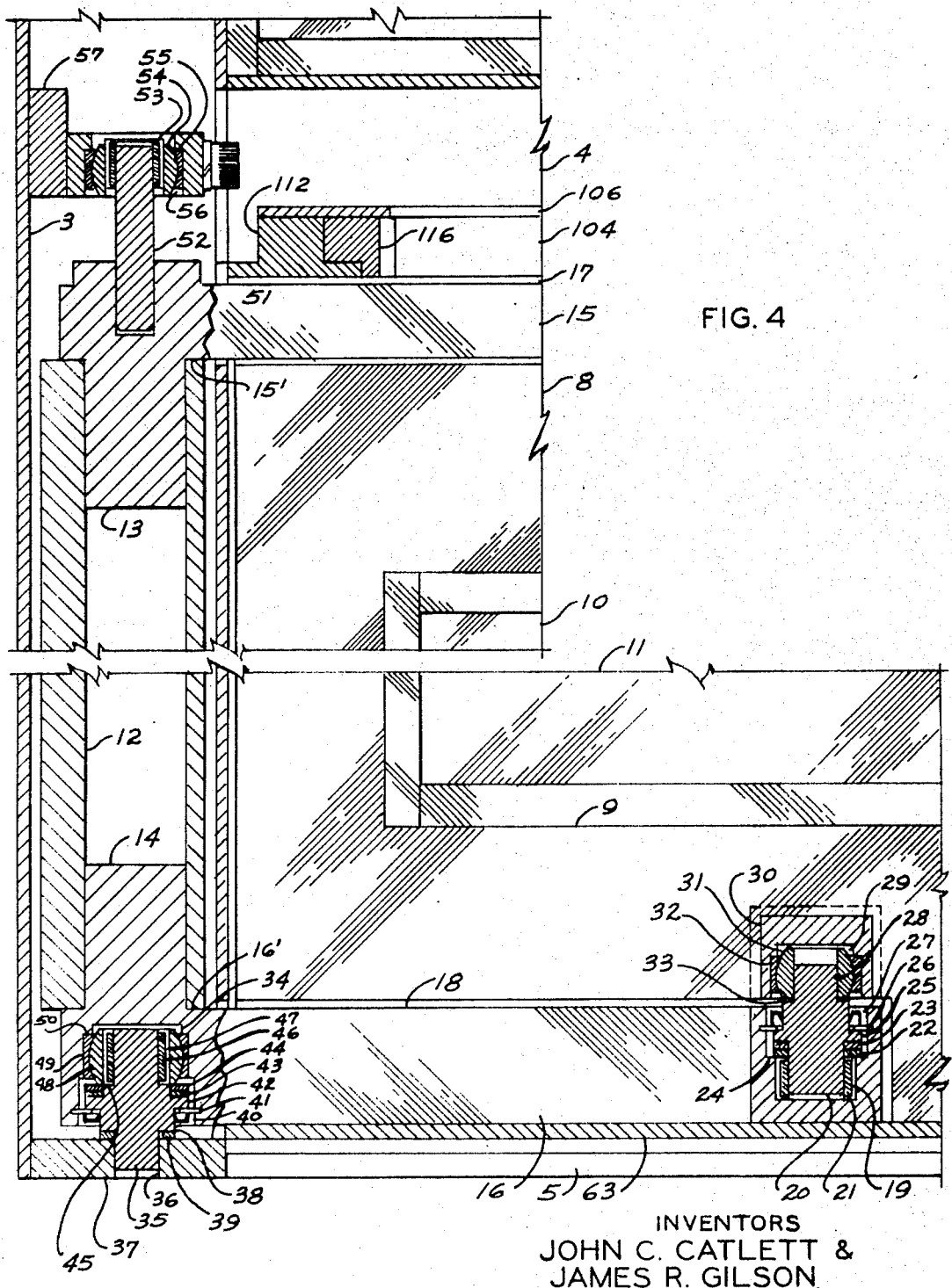
FIGURE 4 is a fragmentary vertical transverse sectional view of the door hinge shaft and related assemblies located in the area generally indicated at 4—4 in FIGURE 1.
Figure 14:
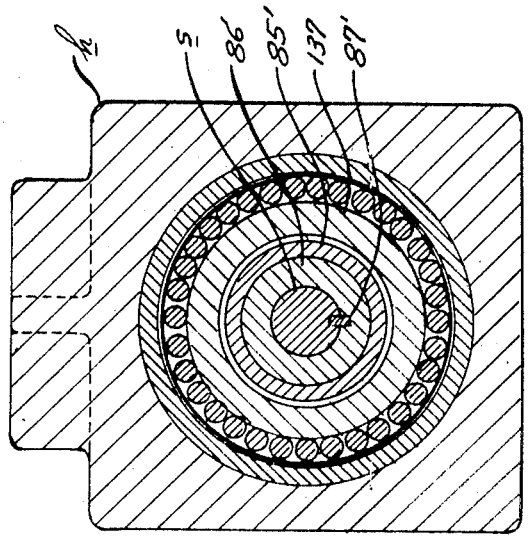
FIGURE 14 is a vertical transverse sectional view taken on the line 14—14 of FIGURE 9.
Figure 7:
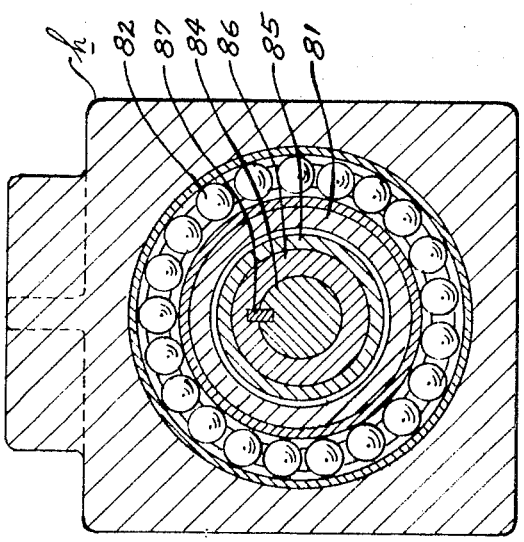
FIGURE 7 is a vertical transverse sectional view taken on the line 7—7 of FIGURE 3.

Provided interiorly of jamb 3 is a hinge shaft 12 being of tubular form (see FIGURE 4) and terminating at its upper and lower ends spacedly from the upper and lower edges, respectively, of the proximate door leafs 8, 9.

Fixed within the upper and lower ends of shaft 12 for rotation therewith are the hubs 13, 14 of upper and lower door pivot arms or levers 15, 16, respectively, which latter are axially normal to hinge shaft 12. Each pivot arm 15, 16 is of an effective length, substantially one-fourth the transverse extent of door 1 and is receivable within an outwardly opening recess 17, 18, respectively, formed in the outer face of the adjacent door leaf 8, 9, respectively, so that when said door is in closed condition the outer face of each pivot arm 15, 16 will be surface-wise aligned with the related door leaf. The inner end portion of each pivot arm 15, 16, beyond the related end of hinge shaft 12, is provided with a shoulder 15', 16' for abutment against the adjacent end surface of hinge shaft 12. Lower pivot arm 16 is provided at its outer or jamb-remote end with an upwardly opening bore 19 for receiving the lower portion of pivot pin 20, the lower extremity of which is journalled in a needle bearing 21, while upwardly thereof the same is journalled within a pair of superimposed thrust bearings 23, 23, which may be of needle type, and are supported upon a shoulder 24 formed in bore 19, bearing against said bearings 22, 23 in opposed relation to shoulder 24 is the undersurface of a circumferential extension 25 integrally formed with pivot pin 20. Above extension 25, pivot pin 20 mounts a retaining seal 26 and an oil seal 27. The upper portion of pivot pin 20 is diametrally reduced as at 28 for extension upwardly into a bore 29 formed in a boss 30 carried in door leaf 9 journalled therein in a ball-type, self-aligning bearing 31 received within a race 32 snugly supported within bore 29; there being a spacer member 33 encircling said upper end of said pivot pin 20 beneath bearing 31. The bearing arrangement for pivot pin 20 allows for proper acceptance of both radial and vertical thrusts of the door while also assuring of proper self-alignment of the bearings with respect to said pivot pin 20.

The inner end of lower pivot arm 16 is provided with a downwardly opening bore 34 for receiving the upper portion of a hinge pin 35, the lower end of which is fixed within an opening 36 formed in base plate 37. Upwardly of base plate 37 hinge pin 35 is diametrally increased to provide a downwardly directed shoulder 38 between which and the upper confronting face of base plate 37 there is disposed a spacer ring 39. Within the lower end of bore 34 an oil seal and a retaining ring 40, 41, respectively, are disposed about said hinge pin 35, being located beneath a circumferential extension 42 integrally formed with said hinge pin 35. Immediately upwardly of said extension 42 hinge pin 35 is journalled within a needle thrust bearing 43 and a thrust washer 44 while upwardly thereof hinge pin 35, being diametrally reduced as at 45, is journalled within a needle bearing 46; there being a spacer 47 surrounding said bearing 46 and with a self-aligning ball bushing 48 engaged about said spacer 47. Ball bushing 48 cooperates with an outer race 49 snugly engaged within bore 34 and bearing against a shoulder 50 provided at the upper end therein. It will thus be seen that hinge pin 35 is coaxial with hinge shaft 12. The bearing arrangement for hinge pin 35 containing both thrust and radial bearings supports hinge pin 35 for absorbing the thrusts acting thereon during usage while permitting of self-aligning so as to assure proper disposition for effective action.

The inner end of upper door pivot arm 15 is provided with an upwardly opening bore 51 for fixedly receiving the lower end of a constant diameter hinge pin 52 the upper end of which, spacedly from the upper end surface of hub 13 of arm 15, is journalled in a needle bearing 53 which latter is disposed within a self-aligning ball bushing 54; said latter cooperating with an outer race 55 rigid within an aperture 56 provided in a support member 57 suitably engaged within jamb 3. It will thus be seen that hinge pin 52 is coaxial with lower hinge pin 35. Accordingly, as indicated in the foregoing, the bearing arrangements for pivot pin 20 and hinge pins 35 and 52 uniquely assure of smooth rotative action while conducing to appropriate self-alignment so as to avoid the development of damaging stresses.

At its outer end upper pivot arm 15 mounts a boss 58 having a vertical opening 59 within which is secured, as by a transverse pin 60, the upper end of a shaft 61 the lower, transversely reduced end portion of which is square in cross-section and depends downwardly of said arm 15 for connection to a door operator indicated generally at A, to be described more fully hereinbelow, which is provided within a housing h carried on door leaf 9. It will be observed that pivot pin 20 and shaft 61 are coaxial.

Door operator A incorporates a motor 62 of the direct current shunt wound type being provided with a permanent magnet (not shown) which may be a single circular magnet surrounding the motor armature (not shown) or may comprise a plurality of circumferentially spaced magnets disposed around the armature to provide a permanent magnetic field for the motor in accordance with well-known practice. Motor 62 is adapted for actuation by an electric switch or switch-type floor mat as indicated at 63 in FIGURE 4 through a series of electrical relays (not shown) provided in an electric control box (not shown) mounted in header 4. Thus switch mat is connected in any suitable manner to the control box. In accordance with well-known practice, switch mat 63 will be activated when a person steps thereon. However, it could be a photoelectric cell, a sonic switch, mechanical switching devices, and the like. Said motor 62 is provided with a main shaft 64 which is coupled with a coaxial input shaft 65 by means of a slip clutch indicated at c having a female driving member 66 engaged upon main shaft 64 for engagement with a driven member 67 comprised of a rubber sleeve 68 suitably mounted upon the proximate end of input shaft 65. Thus, frictional engagement will be maintained between the inner face of member 66 and sleeve 68 as long as a predetermined speed of rotation is not exceeded. However, upon exceeding such speed the frictional engagement between said members will be broken or "slip" so that transmission between said shafts 64 and 65 would be discontinued. Input shaft 65 extends through an opening 69 provided in a partition 70 formed in housing h; there being a bearing 71 provided in said opening 69 for journalling of said shaft 65 and with a plurality of thrust bearings indicated at 72, 73 engaging said shaft on opposite sides of said partition 70. The end portion of input shaft 65, remote from that mounted driven member 67, is engaged to a speed reducer indicated generally 74 being a so-called "Harmonic Drive"[1] and incorporating a circular rigid spline 75 fixed in housing h for engaging a companion spline 76 which is nonrigid and deflected at two points of its circumference by a wave generator 77 which is an ellipsoidal cam having antifriction bearings 78 which rotates and deflects spline 76 into its advancing wave form. The teeth on splines 76, 75, which operate as splines and not as conventional gear teeth, are cut into the same circular shape but the smaller diameter spline 76 has fewer teeth, such as two, than fixed spline 75. Provided centrally of wave generator 77 is a bearing 79 for fixedly engaging the received end of input shaft 65 so that upon rotation of the latter rotation of wave generator 77 will be effected. Thus, with wave generator 77 rotating as in a clockwise direction a continuously advancing wave form is transferred to spline 76 which rotates, with a reduced tangential motion in a counter-clockwise direction. A full rotation of wave generator 77 will produce a counter-rotation of spline 76 only through a distance equal to the difference between circumferences of splines 75, 76, which may be represented by two teeth, so that a speed reduction will be brought about. Spline 76 is carried on the end portion of a coupling casing 80 which

---

Figure 3:
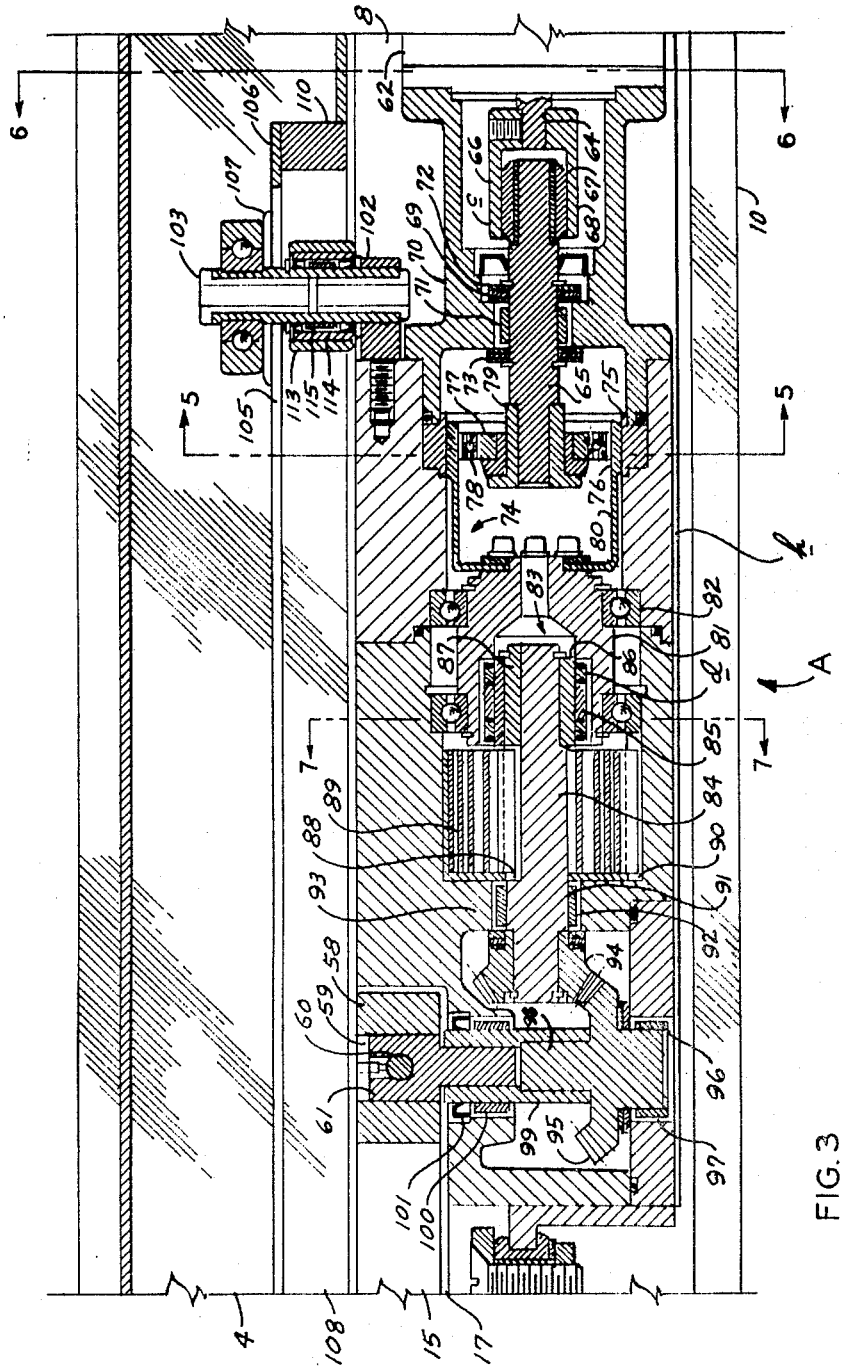
FIGURE 3 is a vertical transverse sectional view of the door operator of the present invention the relative location of which with respect to the door is indicated at 3 in FIGURE 1.

[1] The term "Harmonic Drive" is a trade designation of power transmission devices for United Shoe Machinery Corporation.

mounts on its end face remote from spline 76 a support fitting 81 journalled in antifriction bearings 82 suitably supported within housing h. Said support fitting 81 is provided with an axial bore 83 which receives one end of a gear shaft 84; said latter being coupled to fitting 81 by means of an over-riding or over-running clutch indicated at d and which incorporates a driving member 85 carried within the bore of fitting 81 radially outwardly of the received portion of shaft 84 for engagement with a cooperative driven sleeve-type member 86 mounted on said shaft 84 as by a key 87. As may best be seen in FIGURE 3, gear shaft 84 is coaxial with input shaft 65 and motor main shaft 64 and is thus operatively connected to said input shaft 65 through speed reducer 74.

Clutch d is of conventional character, being designed to maintain engagement between driving and driven members 85, 86 as long as shaft 84 is rotating at less than a predetermined limiting speed, exceeding which disengagement of said members will occur, for purposes presently appearing.

Substantially intermediate its length, gear shaft 84 is provided with an elongated slot 88 for fixedly receiving one end of a compression spring of spiral character 89, disposed concentrically thereabout, the opposite end of said spring being secured to the proximate housing wall as at 90. Shaft 84 is journalled in needle bearing 91 mounted within an opening 92 in a partition 93 formed in housing h and on its end projecting therebeyond mounts a bevel driving gear 94 which meshes with a driven bevel gear 95 journalled at its lower end in a bearing 96 provided within an opening 97 in the base of housing h. Said bevel gear 95 integrally embodies an upwardly projecting stem 98 which is fixed in the lower end of a connector sleeve 99 the upper portion of which latter receives the squared lower end of shaft 61 for relative nonrotatable engagement therewith and thereby completing the interengagement of door operator A to upper door pivot arm 15. The upper portion of connector sleeve 99 is journalled within a bearing 100 mounted within an opening at the top portion of housing h with an oil seal 101 being provided thereabove.

In view of the foregoing, it is to be observed that upon actuation of motor 62 with consequent rotation of main shaft 64, input shaft 65 will be caused to rotate by means of clutch c. By virtue of the consequent rotation of wave generator 77 speed reducer 74 will cause motion transmission to bevel gear shaft 84 but at a speed less than that of shaft 65. Upon rotation of bevel shaft 84, spring 89, which is preferably preloaded, will be caused to compress and thus under such stress store mechanical energy for subsequent usage. Driving bevel gear 94 will thus transmit rotation to driven gear 95 through an angle of 90° so that the force transmitted to shaft 61 will be normal to the coaxis of shafts 64, 65, and 84. Particularly noteworthy is the fact that the components of door operator A are so uniquely related so as to eliminate any mounting or alignment conditions which might create a binding or resistance to movement. The contact between the various elements of said door operator A are of the rolling type as opposed to the sliding type.

Figure 8:
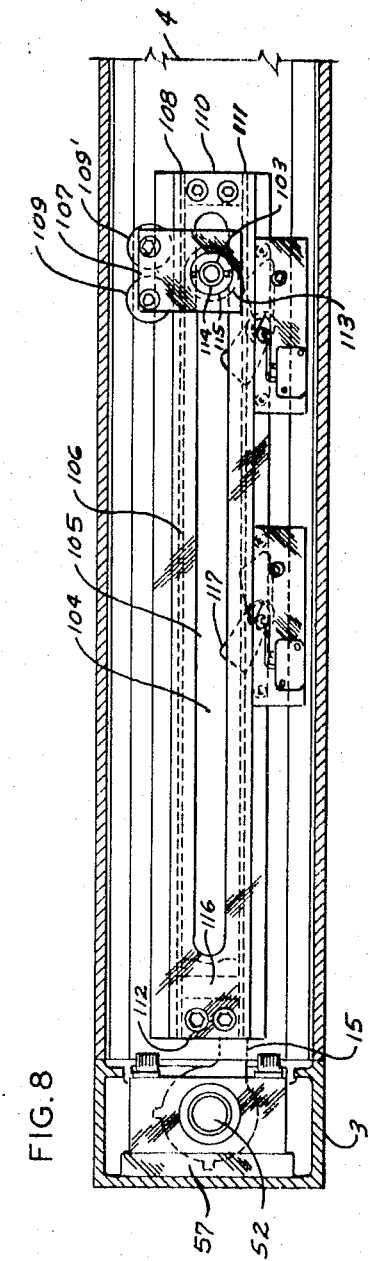
FIGURE 8 is a top plan view in partial section of the operator casing as indicated at 8 in FIGURE 1.
Figure 11:
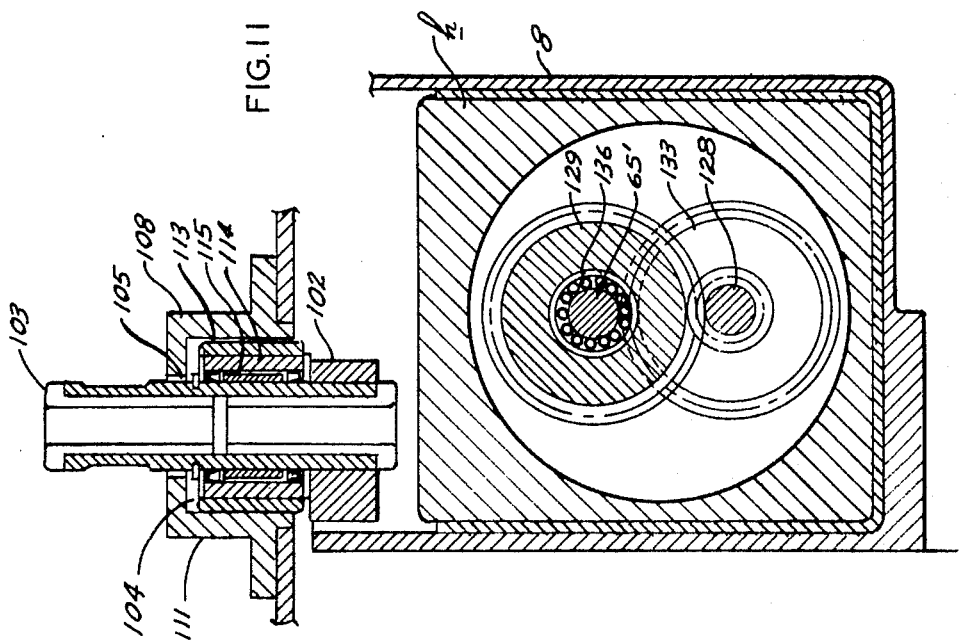
FIGURE 11 is a vertical transverse sectional view taken on the line 11—11 of FIGURE 9.
Figure 10:
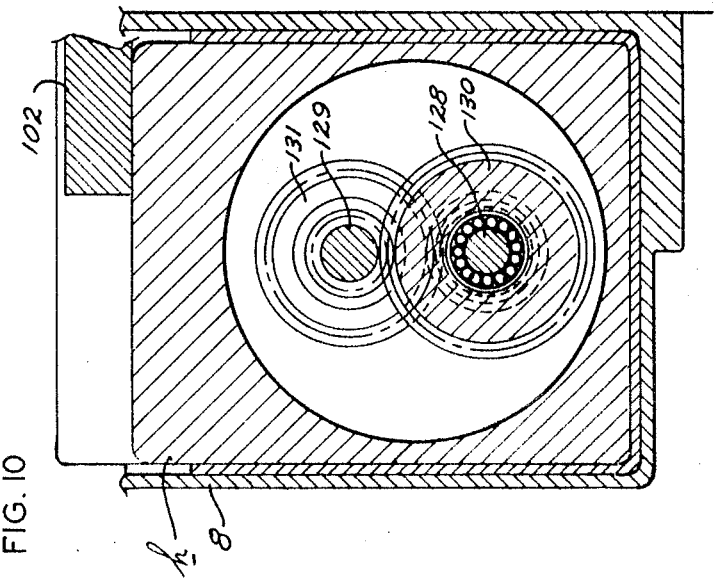
FIGURE 10 is a vertical transverse sectional view taken on the line 10—10 of FIGURE 9.

Secured to the upper end face of housing h, at a point above the central portion of input shaft 65, is a fitting 102 for fixedly receiving the lower end of shaft 103 which extends upwardly above the upper edge of door leaf 8 for projection through an elongated recess 104 formed in the underportion of header 4 and through a narrow slot 105 substantially coextensive with recess 104 formed in the top wall 106 of said recess. On the upper end portion of shaft 103, above top wall 106, there is mounted a carriage plate 107 for supporting at its rearward end, beyond the rearward side wall 108 of recess 104, a pair of stabilizing rollers 109, 109' as may best be seen in FIGURE 8. Said recess 104 is thus defined by top wall 106, rearward side wall 108, outer end wall 110, forward side wall 111 and inner end wall 112 which is in immediate proximity to the upper end of jamb 3; said recess 104 being thus open to the bottom to define a track for movement therethrough of a guide roller 113 carried upon shaft 103 and adapted for rotation thereon by means of radial bearings 114, 115.

Mounted on inner end wall 112 of recess 104 is a roller stop 116 which provides the effective termination of the roller track defined by recess 104.

Thus, with door operator A operating for door opening action, as above described, guide roller 113 will move along a linear path within said recess 104 until the same is brought into abutment with stop 116, thereupon determining the door opening movement. Guide roller 113 together with its related elements serves as a counter-balancing force as the door swings into open position, assuring movement of the door in the predetermined path since guide roller 113 is forced along its prescribed track by reason of the restraining effect upon shaft 103 by the edges of narrow slot 105, which is but a cam-way.

For controlling the operating speed of door 1, as the same is being opened, a cam-type low voltage switch 117 is provided on header 4 for projection into the path of movement of guide roller 113 at a point spacedly from stop 116 for actuation by said roller 113 during door opening operation for reducing voltage to motor 62 and thereby reducing the speed of the same. With low voltage thus being applied to the motor, the same will stall out when door 1 is in open position, or, in other words, when guide roller 113 abuts stop 116, with such stalling thus serving as a brake or holding force. Thus, door 1 will remain in open position, as shown in FIGURE 2 in phantom lines, as long as the actuating switch for motor 62 is closed. However, when said switch is opened, as, for instance, by a person passing from the switch mat, all power to motor 62 is cut off. Thereupon the energy stored in spring 89 is released to cause gear shaft 84 to rotate in the opposite direction to that in which it rotated under influence of main shaft 64. By such rotation of shaft 84 speed reducer 74 will be caused to rotate and thereupon cause a relative increase in speed of rotation of input shaft 65 with consequent rotation of main shaft 64 resulting in rotation of the motor armature (not shown) so as to cause the motor to act as a dynamic brake. By rotation of the armature, motor 62 becomes a generator creating a braking resistance between the armature and the permanent magnetic field. The motor armature is connected to a closed electrical circuit (not shown) which includes variable resistors, so that the closing speed may be increased or decreased by appropriate adjustment of the said resistors. Accordingly, it will be seen that in the door opening operation the motor 62 serves as the motivating force, while in the door closing operation spring 89 provides the requisite driving force. Speed reducer 74 provides a dual function in that it serves to reduce speed during door opening and to increase speed during door closing operation.

Clutches c, d conduce to the smooth operation of door operator A. Slip clutch c, as stated in the foregoing, is designed to slip at a load slightly greater than that requisite for door operation. Should door 1 be jammed in a partially open position, clutch c would slip and prevent motor 62 from stalling in the high voltage position, thereby increasing the life of the electrical equipment of the present invention and controlling the amount of torque that motor 62 transmits to door 1. Overriding clutch d serves primarily for efficient operation when door 1 is operated manually. When said door 1 is so opened, as by pulling upon the handle, clutch d overrides gear reducer 74 and motor 62 only operating spring 89. This same feature serves as a safety to the power equipment in the event that an individual should attempt to push door 1 to open same more rapidly than the door would operate mechanically. Additionally, said overriding clutch d protects the system against damage in the event door 1 is struck or knocked open, eliminating shock loads which might be built up through gear reducer 74 to motor 62.

Although such does not form a part of the present invention, it should be observed from the standpoint of completeness that the electrical system may contain an "on" and "off" switch so as to permit cutting off of the power in the event it is desired to operate door 1 manually. There is also provided within the electrical controls a safety circuit which is so designed to protect an individual standing at the side of the door toward which the door is swinging by cutting off power to prevent operation of the door until the person has moved away. The operating arm of low voltage switch 117 is also adapted to operate a safety switch so that upon movement of guide roller 113 said safety switch will be disconnected when the door is approximately 60° open and will be reconnected upon return movement of guide roller 113 into door-closed condition. In this arrangement when a person is moving through the door from the active side of the switch mat to the safety side, door 1 will continue to open and remain opened until the person has completed his passage.

Figure 9:
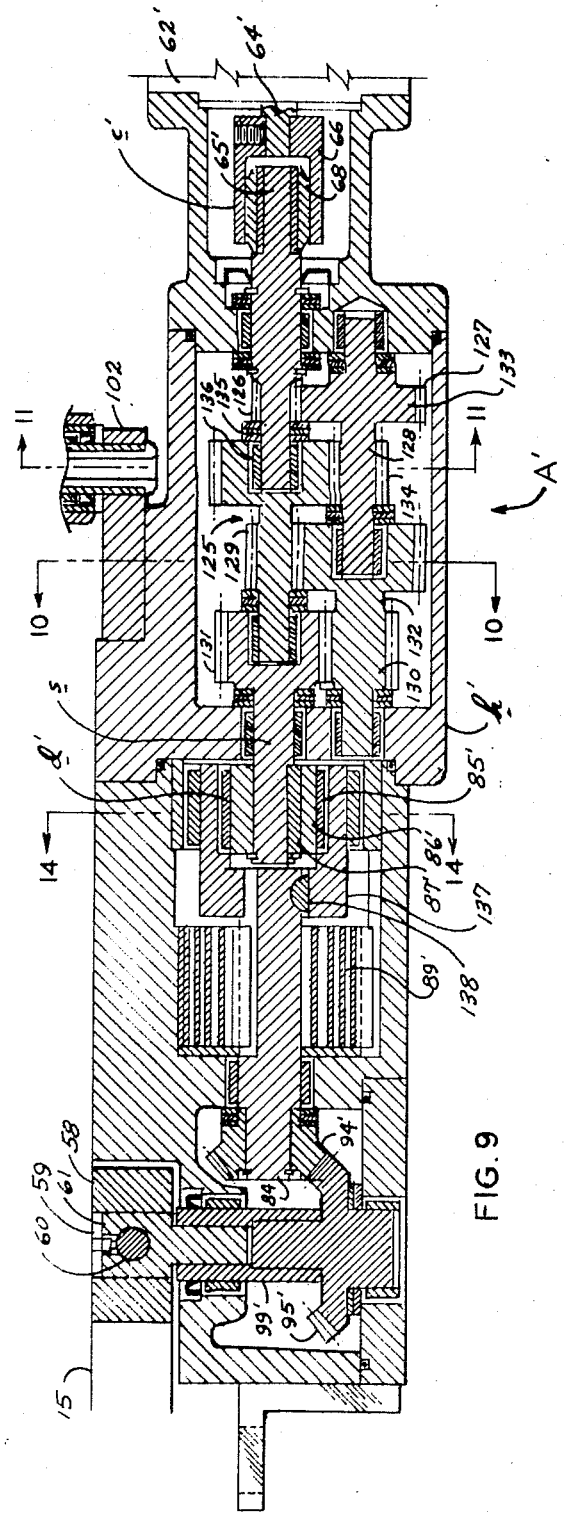
FIGURE 9 is a vertical sectional view of another form of door operator of the present invention constructed in accordance with and embodying the present invention.

Referring now more particularly to FIGURE 9, another form of door operator indicated A' may be provided, if desired, which, in essence, structurally corresponds to door operator A hereinabove described except that the speed reducer 74 of the latter is replaced by a gear train indicated generally at 125, to be more fully described hereinbelow. Door operator A' incorporates a motor 62', a slip clutch c', for coupling a drive shaft 64' with an upper shaft 65'; there being a bevel gear shaft 84', a compression spring 89', a driving bevel gear 94' and a driven bevel gear 95' for connection to shaft 61 through a connector sleeve 99', all of which elements are structurally identical to the corresponding components of door operator A and function in the same manner. Input shaft 65' on its end remote from clutch c' incorporates radially extending gear teeth 126 being of general spur character but having preferably a light helix angle for meshing engagement with gear teeth 127 of a first gear member 128 of gear train 125, there being, in the present instance, three such gear members 128, 129, 130 interposed between input shaft 65' and an output shaft s, which carries at its motor-proximate end gear teeth 131 for intermeshing with the related teeth of the second gear of gear member 130 so that speed reduction between motor shaft 64' and bevel gear shaft 84' may be effected; said output shaft s being engageable with bevel gear shaft 84' through an overriding clutch d'. Each gear member 128, 129, 130 is of like construction except for the prearranged differential in pitch to bring about the desired speed reduction, with each constituting a shaft 132 having formed thereon in longitudinal spaced relationship first and second gears 133, 134, the former being of greater radial extent than the latter. The second gear 134 of each of said gear members meshes with the first gear 133 of the proximate gear member, with the said second gear 134 of gear member 130 meshing with gear 131 to complete the train, as aforesaid. It will be seen that shaft 132 of gear member 129 is coaxial with input shaft 65' and output shaft s, while shafts 132 of gear members 128 and 130 are coaxial and are axially parallel to gear member 129. Each of said gear members 128, 129, 130 are suitably journalled at their ends in both thrust bearings and needle bearings as at 135, 136 within bores and openings formed in partitions in housing h or in the confronting end face of the aligned gear member, as the case may be.

Gear train 125 accordingly transmits rotary motion from input shaft 65 to bevel gear shaft 84' via gear members 128, 129, 130, shaft s and overriding clutch d' with the intermeshing teeth being so designed in accordance with sound practice to bring about a predetermined speed reduction. Overriding clutch d' is fundamentally similar to clutch d hereinabove described with respect to door operator A but with the driven and driving members being, as it were, reversed so that member 86', which is carried on shaft s by key 87', constitutes the driving member while member 85' is the driven member; said latter being engaged to a carrier or sleeve-type fitting 137 which is keyed to bevel gear shaft by key 138.

Door operator A' functions in the same manner as door operator A allowing for speed reduction during the opening operation and for speed increase during the door closing operation under influence or release of energy in spring 89'. Gear train 125 allows for efficient operation by reason of the parti-rolling contact between the component helical gears.

It should be understood that changes and modifications in the formation, construction, and arrangement and combination of the several parts of the Automatic Balanced Door Operator may be made and substituted for these herein shown and described without departing from the nature and principle of our invention.

We claim:

1. In combination with a balanced door having a door frame comprising a header, a pair of side jambs, and a base, said door frame components defining a door opening, a hinge shaft disposed adjacent one of said jambs on the side thereof opposite said opening, a door provided in said opening, lever means connecting said hinge shaft and said door spacedly from the proximate jamb, and a door operator mounted on said door for movement therewith for effecting closing and opening operation of said door, said door operator comprising a prime mover, a main shaft engaged to said prime mover, an input shaft, means connecting said main shaft and said input shaft, an output shaft, speed reducing means connecting said input shaft and said output shaft and gear means engaged to said lever means, said output shaft being engaged to said gear means.

2. The combination as defined in claim 1 and further characterized by said main shaft said input shaft and said output shaft being coaxial for rotating about a common axis.

3. The combination as defined in claim 2 and further characterized by a compression spring provided about said output shaft for stressing upon rotation of the latter during door opening operation.

4. The combination as defined in claim 1 and further characterized by said means connecting said main shaft and said input shaft being a slip clutch overriding clutch means interengaging said output shaft and said speed reducing means.

5. The combination as defined in claim 4 and further characterized by housing means for receiving said door operator, a compression spring provided encirclingly of said output shaft one end of said spring being engaged to said shaft and the opposite end being engaged to said housing so that upon rotation of said shaft upon door opening said spring will be stressed to provide energy for door closing operation, said prime mover being of permanent magnetic character.

6. The combination as defined in claim 1 and further characterized by said speed reducing means constituting a gear train comprising a plurality of intermeshing gear members of helical character.

7. The combination as defined in claim 1 and further characterized by said speed reducing means comprising a motion transmission means having a fixed spline, a non-rigid spline, and a wave generator, said wave generator being rotatably engaged to said non-rigid spline for effecting movement of the latter.

8. In combination with a balanced door having a door frame comprising a header, a pair of said jambs, and a base, said door frame components defining a door opening, a hinge shaft disposed adjacent one of said jambs on the side thereof opposite said opening, a door provided in said opening, lever means connecting said hinge shaft and said door spacedly from the proximate jamb, and a door operator mounted on said door for movement therewith for effecting closing and opening operation of said door, said door operator comprising a prime mover, a main shaft engaged to said prime mover, an input shaft, first means connecting said main shaft and said input shaft, an output shaft, second means connecting said output shaft and said input shaft, gear means, motion transmitting means connecting said output shaft and said gear means, and third means connecting said gear means and said lever means.

9. The combination as defined in claim 8 and further characterized by said main shaft, said input shaft and said output shaft being coaxial to rotate about a common axis, said lever means being moveable within a plane parallel to the common axis of said shafts.

10. The combination as defined in claim 8 and further characterized by a compression spring provided encirclingly about said output shaft, and said first means connecting said main shaft and said input shaft being a clutch.

11. The combination as defined in claim 8 and further characterized by said motion transmitting means comprising a speed reducer engaged to said input shaft, an overriding clutch engaged to said speed reducer, and said output shaft being engaged to said overriding clutch.

12. A combination as defined in claim 8 and further characterized by said motion transmitting means being a gear train comprising a plurality of intermeshing helical gear members, and an overriding clutch engaged to one end of said gear train and to said output shaft.

References Cited

UNITED STATES PATENTS

| | | | |
|---|---|---|---|
| 2,019,526 | 11/1935 | Ellison | 49—386 X |
| 2,207,365 | 7/1940 | Williams | 49—246 X |
| 2,637,877 | 5/1953 | Hanssen | 49—386 X |
| 3,247,617 | 4/1966 | Catlett | 49—107 |

DAVID J. WILLIAMOWSKY, Primary Examiner

J. K. BELL, Assistant Examiner

U.S. Cl. X.R.

49—253, 260, 264, 358